Sept. 27, 1949.　　　G. J. L. GUYOT ET AL　　　2,482,849
METHOD AND MEANS FOR MEASURING THE MICROPHONIC
ACTION OF MULTIELECTRODE TUBES
Filed Dec. 5, 1947　　　　　　　　　　　　　　3 Sheets-Sheet 1

INVENTORS:
Gaston Julien Louis Guyot.
Paul Gillet.
by

Attorney.

Patented Sept. 27, 1949

2,482,849

UNITED STATES PATENT OFFICE 2,482,849

METHOD AND MEANS FOR MEASURING THE MICROPHONIC ACTION OF MULTIELECTRODE TUBES

Gaston Julien Louis Guyot and Paul Gillet, Paris, France

Application December 5, 1947, Serial No. 789,853
In France October 16, 1946

Section 1, Public Law 690, August 8, 1946

12 Claims. (Cl. 315—367)

Methods are known and already in use for measuring the microphonic action of vacuum tubes within the audible range of frequencies. One of said methods consists in particular in measuring the maximum value of the instantaneous amplitude of the anode current when a percussion is applied to the tube. Such percussions are roughly gauged, preferably by means of a ball falling from a predetermined height, and producing a shock on the tube support.

Such a method does not effect an accurate measurement of the microphonic effect and more particularly, it provides no information as to the behaviour of the tube when it is submitted to an acoustic reaction.

For measuring the acoustic action of a tube submitted to acoustic reaction, it has been proposed to define the oscillating point of a reaction circuit including the tube and amplifier and a loud-speaker.

This method allows the frequency of oscillation at the oscillating point to be measured and thereby to a certain extent the damping of the natural oscillation corresponding to said frequency.

However, according to said method, the measure is operative for a single frequency of the oscilating point, i. e. that corresponding to the natural frequency of the tube providing the minimum amount of damping.

As a large number of natural frequencies with different damping values exist, the above referred to method is obviously incomplete.

Our invention has for its particular object to remove such a drawback.

It covers to this purpose a method for measuring the microphonic action of multi-electrode tubes, according to which we energize acoustically at different frequencies the tube to be tested which may then be considered as a microphone and the variations of one of the electrical characteristics of said tube such as anode, screen or grid current or the like is measured for ascertaining the microphonic reaction of the tube throughout the range of audible frequencies.

According to a preferred form of execution, the energization frequencies of the tube to be tested are caused to vary in a continuous manner and the response curve of the tube is recorded.

According to another form of execution, the sound pressure energizing the tube is held constant whatever may be the frequency of energization.

According to a modification, we energize acoustically both the tube to be tested and a microphone used for comparison and the characteristic of which is independent of frequency and the difference between the reactions of the comparing microphone and those of the tube to be tested is noted so as to allow the natural reaction of the tube which is being tested to be ascertained even if the sound pressure varies in accordance with the energization frequency.

Our invention is applicable generally speaking to such methods, whatever may be the arrangement provided for their execution. However, our invention is also applicable to an arrangement allowing a particularly simple and efficient execution of the preceding method or of similar methods and it is characterized by a comparison microphone energized simultaneously with the tube to be tested by a sound pressure of variable frequency and a differential device wherethrough it is possible to find out the reaction of the microphone as a function of the variation in the energizing sound pressure and consequently the reaction of the tube alone.

A further object of our invention consists in an arrangement for executing the preceding method or like methods including a regulating microphone and a detector for the microphone reactions providing a biasing voltage for the amplifier of the sound pressure source, which depends on said pressure and is adapted to keep constant the sound pressure fed by the sound source for energizing the tube to be tested.

Our invention covers also the features and the different possible combinations thereof to be described hereinafter.

Arrangements for measuring the microphonic action of the multiple electrode tubes according to the invention are illustrated by way of examples in accompanying drawings wherein.

According to our invention, the vacuum tube is considered as a microphone and it is energized acoustically at frequencies that vary in a continuous manner.

The tube to be tested responds more or less to the action of different frequencies, which corresponds to a modification of one of its electric characteristics such as the anode current, grid current, screen current, braking grid current, etc.

The energizing frequency varies continuously at a reduced speed within the acoustic band of 10 to 15,000 periods per second and this leads to a reinforcement of the anode alternating current when the energizing frequency coincides with a resonance frequency of the system including the tube and its support. The amplitude measures to a certain extent the damping of this resonance frequency. Obviously, it is necessary for the sound pressure in the plane of the tube to be kept constant as a function of the frequency.

The electrical characteristics giving out the response of the tube for various energization frequencies are recorded.

It is also possible to provide for holding yieldingly the tube in order to avoid the introduction of further resonance frequencies due to the system including the tube and its support; to this purpose it is possible to make use of any well-known prior methods. But possibly it may be of interest to include the action of the support in the measure executed, when the supports are antivibrating for instance. This is generally always the case in practice.

Figure 1:
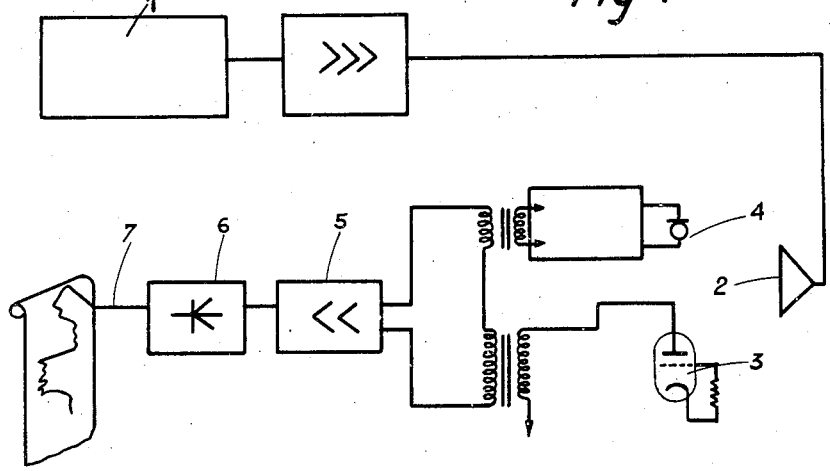
Figs. 1 and 2 illustrate diagrammatically two forms of execution of the arrangement.

Turning to Fig. 1 illustrating a first form of execution of the method disclosed, it shows a low frequency generator 1 providing a continuous range of frequencies between 10 and 15,000 periods per second for instance, for energizing the loud-speaker 2. In front of said loud-speaker and at a distance thereof equal to about 1 meter is located the tube 3 to be tested, said tube being elastically suspended to a washer made of sponge rubber for eliminating the resonant action of the support. Said tube 3 feeds an amplifier 5 followed by a detector 6 feeding the recorder 7.

For eliminating the response curve of the loud-speaker, we use a comparison microphone 4.

Said microphone 4 is connected with the same amplifier 5 as the tube 3. This allows the response curve of the microphone alone to be recorded while eliminating the tube to be tested 3 and then the response curve of the system including both the microphone 4 and the tube to be tested 3.

We obtain thus two records depending solely on the acoustic pressure existing in front of the loud-speaker 2. It is sufficient to provide for the difference between the two records corresponding respectively to the tube to be tested associated with the microphone and to the microphone alone; this produces the response curve of the tube alone.

It is possible to find the resonance frequencies of the tube by making use of the Larsen effect as disclosed hereinabove. To this end we insert a band pass filter in the circuit and we check that an oscillation point is obtained for the resonance frequency lying inside the band pass filter used.

Figure 2:
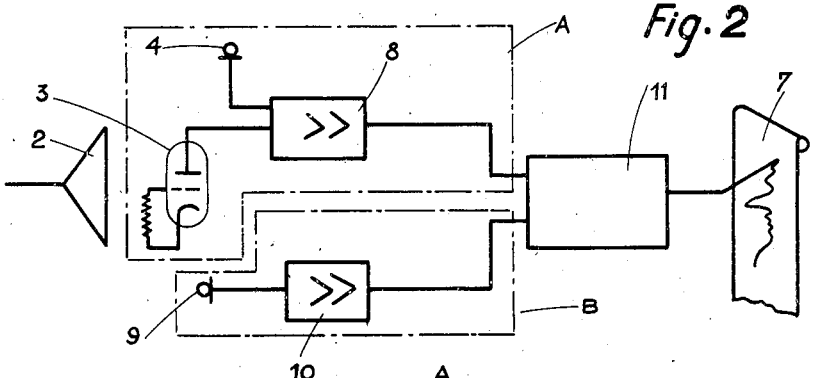

Fig. 2 illustrates an arrangement for measuring the microphonic action of tubes, wherein the result is provided directly through a single record.

To this purpose the tube 3 to be tested and the microphone 4 are mounted in front of the loud speaker 2 and are inserted in a circuit A including an amplifier 8 while a second microphone 9 identical with the first microphone 4 is inserted in a circuit B including an amplifier 10.

The two circuits A and B are applied to a differential detector 11 providing the difference in the detected voltages respectively from the circuits A and B. Thus the recorder 7 produces automatically the microphonic characteristic of the tube 3 to be tested.

According to another form of execution, it is possible to produce directly the difference between the voltages appearing at the terminals of the microphone 4 alone and of the tube 3 alone.

Figure 3:
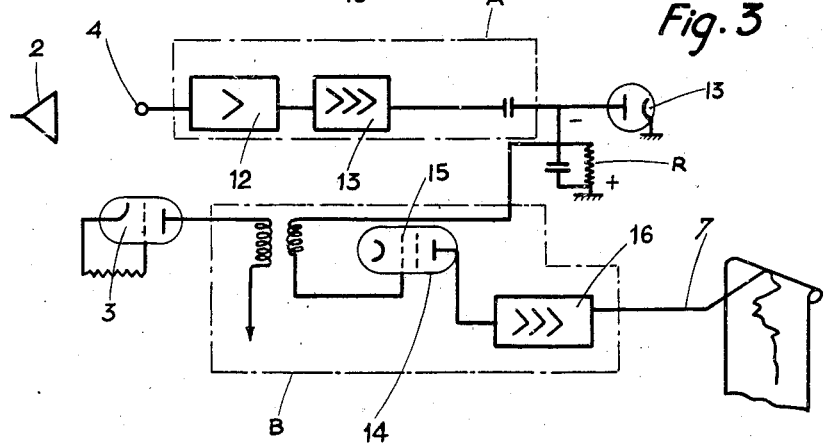
Fig. 3 illustrates diagramatically another form of execution of the arrangement wherein the amplification of the reaction of the tube to be tested varies in an opposite ratio with the energizing sound pressure.

Fig. 3 illustrates another form of execution wherein the microphone 4 is inserted in a circuit A provided with a preliminary amplifier 12 and an amplifier 13'.

The voltage at the terminals of the amplifier is detected by a detector 13 and the detected voltage appearing across the terminals of the resistance R is used for biasing the grid 15 of a further preliminary amplifier tube 14 to the terminals of which the tube 3 to be tested is coupled.

The circuit B inside which the lamp 3 is mounted includes said preliminary amplifier 14 biased by the detected voltage from the circuit A of the microphone 4 and a main amplifier 16, which latter acts on the recording apparatus 7.

The above disclosed arrangement operates as follows:

At the output from the circuit or chain A, the voltage obtained is:

$$V = K1 K2 P$$

K1 being the efficiency of the microphone 4, K2 the gain of the amplifiers 12 and 13' and P the sound pressure produced by the loud speaker 2.

As with good microphones such an electrostatic Neumann microphone K1 is practically independent of frequency and the amplifier 13' and the preliminary amplifier 12 have a gain that is also practically independent of frequency, it is possible to write that the output voltage $V = K \times P$, P being the variable parameter. At the output of the circuit, or chain B the voltage would be in the case of the use of an ordinary amplifier chain $V' = K3P$.

It is therefore necessary to measure $K3$ which is the efficiency of the tube 3 considered as a microphone independently of P.

When P varies, the value of the above voltages becomes:

$$V = KnP \text{ and } V' = K3nP$$

$n$ being a coefficient depending on frequency, $n = f(\omega)$. In order to eliminate the action of the pressure parameter in the chain B, it is sufficient to multiply the above expression by $$\frac{1}{n}$$

which leads to $V' = K3, n$.

$$P \times \frac{1}{n} = K3P$$

This means that the gain of the chain should vary in an opposite ratio with reference to pressure. To this purpose, it is sufficient to have an amplifier the gain of which is proportional to $$\frac{1}{n}$$

that is the characteristic of which is hyperbolic. This result is obtained by controlling, through the chain A the biasing the variable slope tube 14 in chain B, which tube has a hyperbolic characteristic in accordance with the conventional arrangement of antifading regulators. This is obtained by biasing the preliminary amplifier 14 of the circuit B, as shown, through the voltage from the terminals of the resistance R of the detector 13 in circuit A.

Figure 4:
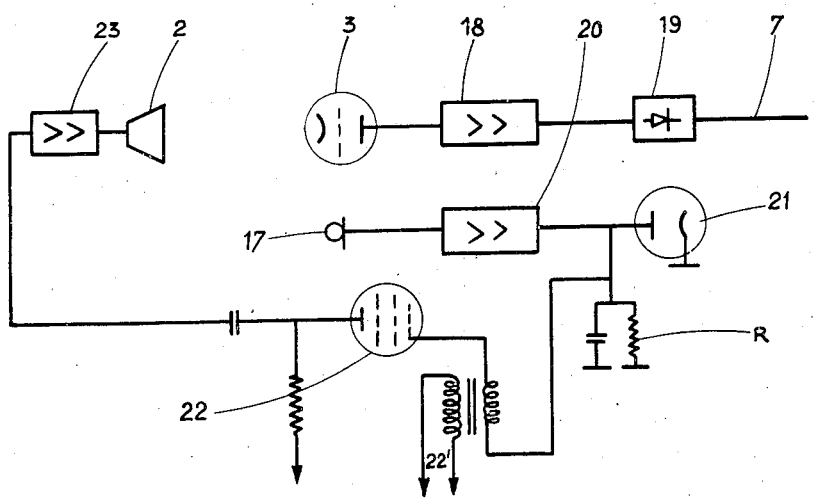
Fig. 4 illustrates a fourth form of execution of an arrangement wherein the energizing sound pressure is kept constant.

Fig. 4 shows a modification of the diagram illustrated in Fig. 3 allowing an easier adjustment while keeping the sound pressure constant in the vicinity of the tube 3 to be tested through the agency of a regulating microphone 17.

To this purpose, the tube 3 to be tested is mounted at the terminals of an amplifier 18 followed by a detector 19 controlling the recording device 7.

The sound pressure from the loud-speaker 2 being constant, whatever may be the frequency of energization, it is no longer necessary to provide a comparison with a microphone 4 as in the preceding cases, where such a microphone serves for recording the variations in the pressure produced by the loud-speaker 2.

To hold constant the pressure of the loud-speaker 2, we use a regulating microphone 17 impressed by the sound from loud-speaker 2. The energizing voltage from the microphone 17 is amplified at 20 and detected at 21. The detected voltage appearing at the terminals of the resistance R of the detector 21 is used for biasing the preliminary amplifier 22 in the amplifying circuit system of the loud-speaker 2, in a manner such as will adjust the power produced by said loud-speaker and make it constant after the manner of an antifading device. To this purpose, the preliminary amplifier 22 includes a variable slope tube energized by a low frequency source of voltage 22' the frequency of which is continuously variable.

This preliminary amplifier stage 22 feeds the power amplifying chain 23 for the loud-speaker 2.

Figure 5:
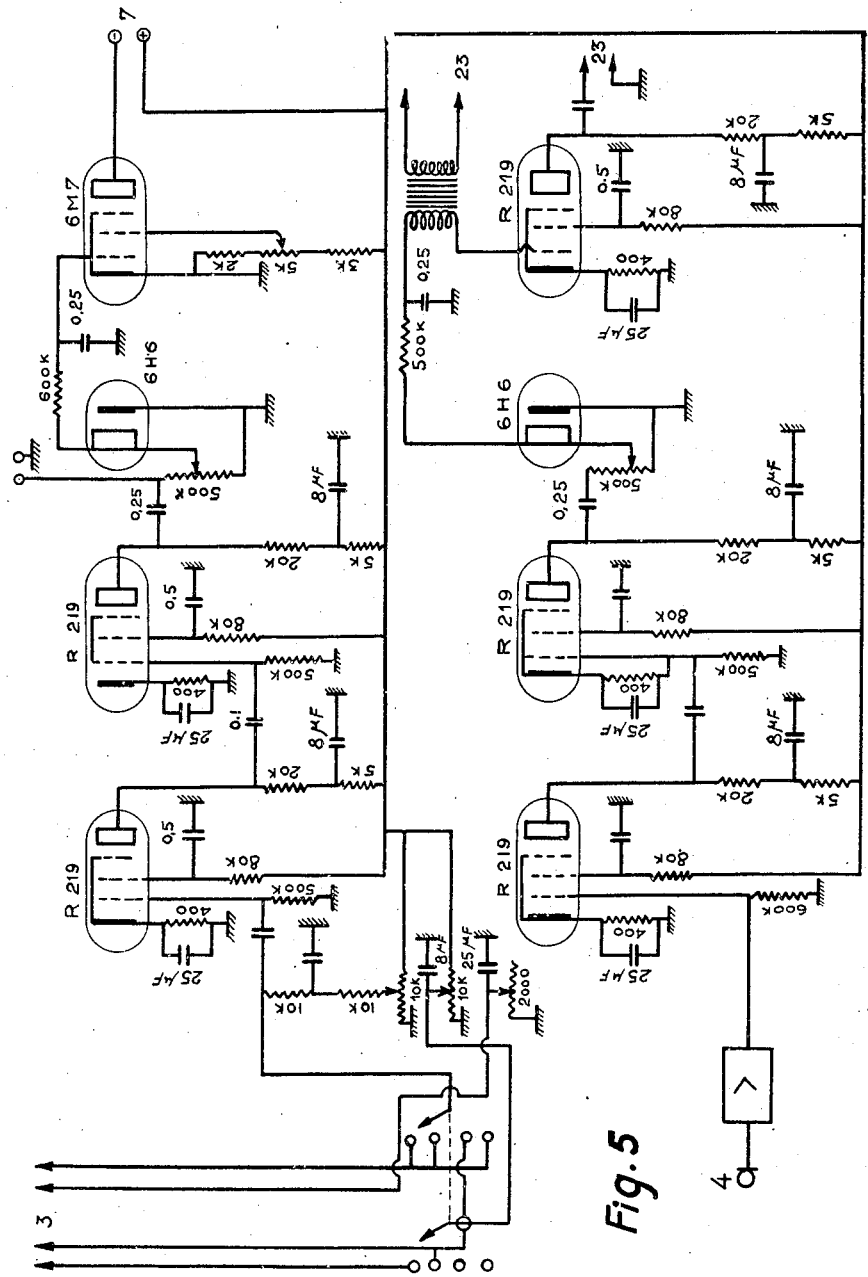
Fig. 5 shows an industrial form of execution of the arrangement of Fig. 4.

Fig. 5 illustrates by way of example one of the practical forms of execution, adapted for industrial purposes, of the arrangement disclosed with reference to Fig. 4, figures being given out for each resistance and capacity.

What we claim is:

1. A method for measuring the microphonic action of a vacuum tube consisting in energizing acoustically at different frequencies the vacuum tube and measuring the consequent variations of a current fed by said tube.

2. A method for measuring the microphonic action of a vacuum tube consisting in energizing acoustically in a continuous manner throughout at least part of the range of audio-frequencies the vacuum tube and recording the consequent variations of a current fed by said tube.

3. A method for measuring the microphonic action of a vacuum tube consisting in energizing acoustically at different frequencies the vacuum tube while maintaining the sound pressure acting on the tube at a constant value and measuring the consequent variations of a current fed by said tube.

4. A method for measuring the microphonic action of a vacuum tube consisting in energizing acoustically at different frequencies the vacuum tube and simultaneously a comparison microphone the reaction of which is independent of frequency, measuring the total reaction current fed by the tube and microphone, measuring that of the microphone alone and forming the difference of the measurements.

5. An arrangement for measuring the microphonic action of vacuum tubes comprising a microphone the reaction of which is independent of frequency, means for impressing a sound pressure of variable frequency simultaneously onto the vacuum tube and onto the microphone, and means associating the reaction currents fed by the vacuum tube and by the microphone for indicating the value of the former currents under constant sound pressure conditions.

6. An arrangement for measuring the microphonic action of vacuum tubes comprising a microphone the reaction of which is independent of frequency, means for impressing a sound pressure of variable frequency simultaneously onto the vacuum tube and onto the microphone, means for superposing the reaction currents fed by the vacuum tube and by the microphone and means for indicating the value of the superposed current and that of the reaction current from the microphone alone.

7. An arrangement for measuring the microphonic action of vacuum tubes comprising a microphone the reaction of which is independent of frequency, means for impressing a sound pressure of variable frequency simultaneously onto the vacuum tube and to the microphone, means for superposing the reaction currents fed by the vacuum tube and by the microphone, means for subtracting a current equal to the reaction current from the microphone from the superposed reaction current and means for recording the resultant current.

8. An arrangement for measuring the microphonic action of vacuum tubes comprising a microphone the reaction of which is independent of frequency, means for impressing a sound pressure of variable frequency simultaneously onto the vacuum tube and onto the microphone, a circuit fed simultaneously by the reaction currents from the microphone and from the tube, a further circuit fed by a reaction current equal to that produced by the microphone alone, and differential indicating means sensitive to the difference in the currents in the two circuits.

9. An arrangement for measuring the microphonic action of vacuum tubes comprising a microphone the reaction of which is independent of frequency, means for impressing a sound pressure of variable frequency simultaneously onto the vacuum tube and onto the microphone, an amplifier fed by the vacuum tube and means whereby the reaction current from the microphone acts on the amplifier for making the amplification reversely proportional to the sound pressure from the sound impressing means.

10. An arrangement for measuring the microphonic action of vacuum tubes comprising a microphone the reaction of which is independent of frequency, means for impressing a sound pressure of variable frequency simultaneously onto the vacuum tube and onto the microphone, an amplifier fed by the vacuum tube and including an amplifier tube, a circuit fed by the microphone and including a detector, means for applying the detected voltage therefrom as a biasing voltage to the amplifier tube for making the amplification in the amplifier reversely proportional to the sound pressure.

11. An arrangement for measuring the microphonic action of vacuum tubes comprising a microphone the reaction of which is independent of frequency, means for impressing a sound pressure of variable frequency simultaneously onto the vacuum tube and onto the microphone, an amplifier feeding said sound impressing means, a detector fed by the microphone, means whereby the detector applies a biasing voltage to the amplifier for constraining the sound pressure to remain constant and means for indicating the value of the current fed by the vacuum tube the action of which is to be measured.

12. An arrangement for measuring the microphonic action of vacuum tubes comprising a microphone the reaction of which is independent of frequency, means for impressing a sound pressure of variable frequency simultaneously onto the vacuum tube and onto the microphone, an amplifier feeding said sound impressing means and including a variable slope amplifying tube, a detector fed by the microphone, means whereby the detector applies a biasing voltage to the amplifying tube for constraining the amplification producing the sound pressure to vary in a ratio that is reversely proportional to the variations in sound pressure acting on the microphone and tube.

GASTON JULIEN LOUIS GUYOT.
PAUL GILLET.

REFERENCES CITED

The following references are of record in the file of this patent:

UNITED STATES PATENTS

| Number | Name | Date |
|---|---|---|
| 2,418,437 | Vogt | Apr. 1, 1947 |